June 3, 1930. W. HUFF 1,761,791
PLANTER
Filed Oct. 5, 1928 2 Sheets-Sheet 2
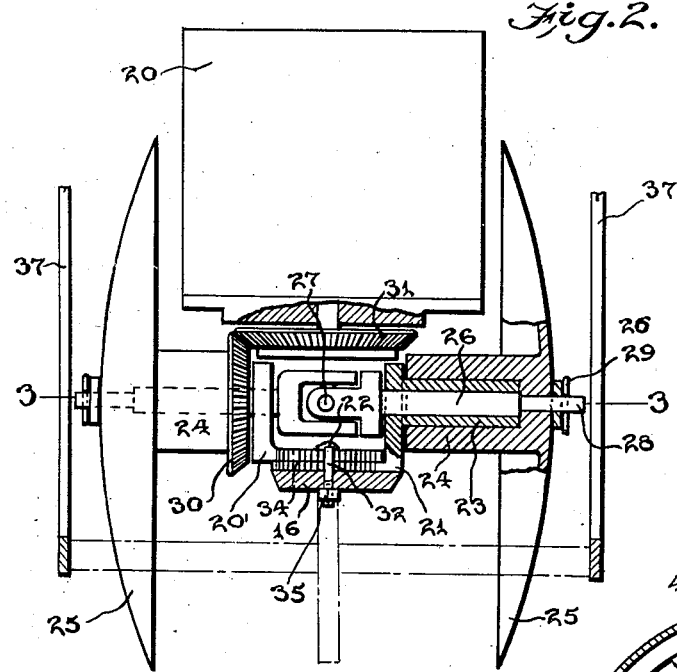
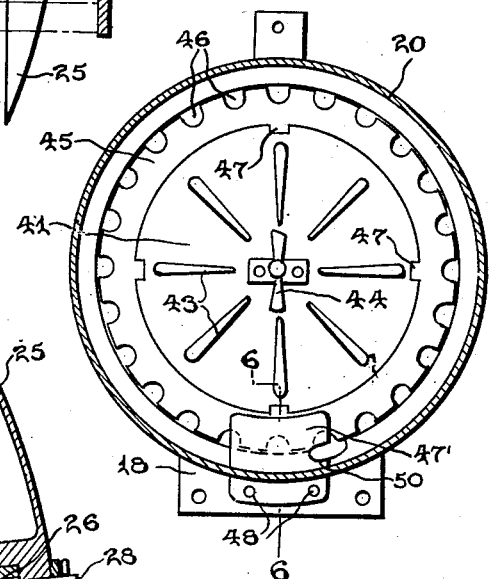
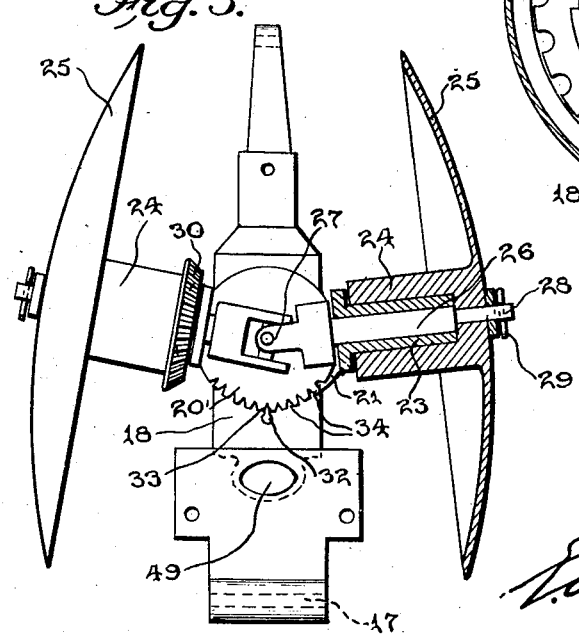
Inventor
Walter Huff,
Attorney Patented June 3, 1930

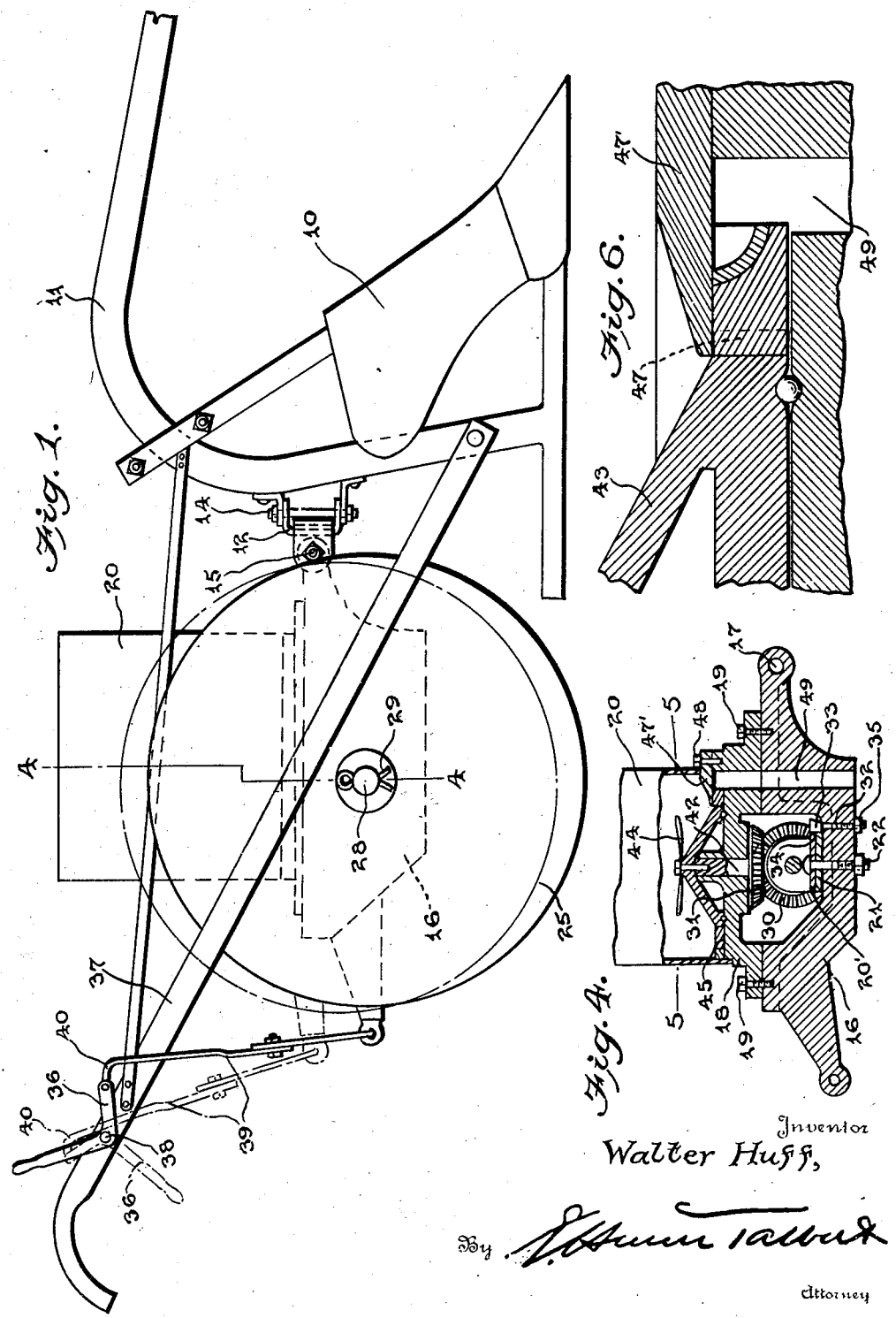

1,761,791

UNITED STATES PATENT OFFICE

WALTER HUFF, OF HARWOOD, TEXAS

PLANTER

Application filed October 5, 1928. Serial No. 310,630.

The object of the invention is to provide a planter particularly adapted as an implement to be attached to and drawn by a plow such as a middle breaker, so that the ground opening or furrow forming operation of the latter may be immediately followed by the seed dropping and covering operation of the former, thus making one motive means, whether it be a tractor or draft animals, all that is necessary; to provide a plow drawn planter which is rendered active or inactive by the bodily lowering or raising of the same by means of a simple hand lever; to provide a planter in which the ground covering elements are in the form of rotary members rolling over the ground in performing the covering operation and in addition actuating the seed dropping means; to provide a planter in which the covering members are arranged in divergent relation and readily adjustable to vary the angle of divergence; and to provide a device of this nature in which the seed dropping mechanism is of simple but yet sturdy form, so that it will not be likely to damage under the most trying conditions of operation and at the same time be susceptible of cheap manufacture and low marketing cost.

With this object in view the invention consists in a construction and combination of parts of which a preferred embodiment is illustrated in the accompanying drawings, wherein:

Figure 1 is a side elevational view of the invention.

Figure 2 is a rear elevational view.

Figure 3 is a sectional view on the plane indicated by the line 3—3 of Figure 2.

Figure 4 is a sectional view on the plane indicated by the line 4—4 of Figure 1.

Figure 5 is a sectional view on the plane indicated by the line 5—5 of Figure 4.

Figure 6 is a detail sectional view on the plane indicated by the line 6—6 of Figure 5.

The invention is designed as an attachment for use in connection with a plow 10 conventionally known as a middle breaker, to the beam 11 of which it is coupled, as indicated at 12, this coupling, by reason of its vertical pivot 14 permitting lateral swinging movement and by reason of its horizontal pivot 15 permitting it to be raised and lowered.

The base casting 16 connects with the horizontal pivot 15 by means of an eye 17 formed in the forward end of the former and on this base casting is seated a cap casting 18 which is connected to the former by means of cap screws 19. The cap and base castings of which the former carries the seed box 20, define a space in which are disposed angular brackets 20 and 21 of which the horizontal flange of the former rests on the corresponding flange of the latter and this latter flange on the bottom of the recess in the base casting to which a pivotal connection is effected by means of a pivot bolt 22. The vertical flanges of the angular brackets 20 and 21 are formed with tubular journals 23 on which are rotatably mounted the hubs 24 of the covering disks 25, the latter being of cupped form and circular, so that when in contact with the ground to perform the covering operation for the deposited seed they may rotate.

The covering disks 25 are operatively connected for rotation in synchronism and to this end there is provided a shaft 26 which at its longitudinal center includes a universal joint 27, the joint being interposed between the vertical flanges of the brackets 20 and 21 and its ends extending through the tubular journals 23 and terminating in the reduced extremities 28 which pass through the covering disks and receive the terminal fasteners 29 by which the disks are secured to the shaft. The reduced extremities 28 form shoulders with the major portions of the shafts at the outer ends of the tubular journals, so that a lateral abutment may be provided for the covering disks and the latter are preferably keyed to these reduced extremities either by making them cross-sectionally angular or by using any of the conventional forms of keying.

The hub of one of the disks 25 is provided with a bevel gear 30 meshing with the bevel gear 31 by means of which distribution of seed from seed box 20 is made.

The covering disks are mounted for the adjustment of their axes of rotation and in operation are normally arranged in divergent relation, the angle of divergence being variable by such adjustment. The adjustment is effected by swinging the angle brackets 20 and 21 around the bolt 22 as a pivot and the selected adjustment is maintained with a key bolt 32 mounted in the base casting, its key 33 engaging selected notches in the series of notches 34 formed on the forward arcuate edges of the horizontal flanges of the two brackets. Release of the nut 35 on the key bolt permits the latter to be elevated to raise the key 33 above the plane of the horizontal flange of the bracket 20 and the two brackets may then be swung until the disks assume the desired angle of divergence, when the lowering of the bolt 32 to bring the key 33 into the registering notches 34 lying in the center line between the bolts 22 and 32 locks the brackets in position and maintains the desired angular position of the covering disks.

The universal joint 27 in the shaft 26 provides for the angular adjustment of the covering disks without affecting the positive driving connection between the two.

The apparatus is active when the covering disks rest upon the ground and as the plow is advanced, these disks rotate and in addition to performing the seed covering operation actuate the seed dropping mechanism. The horizontal pivot 15 of the coupling 12 provides for swinging movement of the apparatus in a vertical plane and gravity therefore keeps the covering disks in contact with the ground despite the irregularities in contour of the latter. When it is desired to render the apparatus inactive, the whole is elevated, the means for accomplishing this consisting of a bell-crank lever 36 pivotally mounted on the plow handle 37, as indicated at 38, the short arm of the lever having a link connection 39 with the base casting 16, the link being formed with an angular terminal 40 connecting with the lever, so that when the latter is swung to the dotted position indicated in Figure 1, the whole apparatus may be elevated and retained in said elevated position by reason of the fact that the straight line passing through the pivotal connections of the link with the lever and the base casting is disposed rearwardly of the pivot 38, so that the weight of the apparatus, therefore, tends to swing the lever 36 left-handedly, as viewed in Figure 1, instead of right-handedly, as when the center line through the terminals of the link is disposed forwardly of the pivot 38 and the apparatus is free to drop by gravity to bring the covering wheels into contact with the ground.

Within the seed box 20 there is disposed a rotary table 41, this table being provided with a shaft 42 journaled in the cap casting 18 and the bevel gear 31, being mounted on the lower end of this shaft, communicates motion to the table. The table is formed with uniformly spaced radial ribs 43 of angular form in side elevation and these ribs are disposed to give the table the general form of a cone at the apex of which is mounted an agitating blade 44 to prevent choking of the contents of the seed box. The seed depositing means consists of a ring 45 peripherally bounding the table at the bottom and formed in its outer periphery with uniformly spaced notches or recesses 46 which constitute cells or pockets in which the seed may drop. As the table is rotated, the ring 45 is likewise rotated, having a positive connection with the table by reason of keys 47, and the notches 46 are successively passed under the canopy plate 47' secured to the cap casting by cap screws, as at 48, and projecting into the seed box in covering relation to the chute 49 consisting of a duct extending vertically through the cap and base castings 18 and 16. The canopy plate 47' extends laterally beyond the chute on either side and the side wall of the cap casting on the entrance side of the notches under the canopy plate is cut or ground away as indicated at 50, so that a clearance space may be provided to permit the settling of the seed in its notch or cell just prior to passage underneath the canopy plate so that there may be no tendency to crush or crack the seed.

The ring 45 is a removable and replaceable with another ring of the same general form but with differently formed notches, to suit the character of seed being deposited. That is, the equipment comprises a plurality of rings 45 notched to provide seed cells for different characters of seed and they may be selectively used by simply raising out the one and dropping in the other, all having keys 47 engageable in the peripheral key slots of the table.

As the seed cells, consisting of the notches formed in the seed rings, pass under the canopy plate, the contents of each is discharged into the seed chute 49 and dropped upon the ground, being covered by the disks as the apparatus is advanced.

The invention having been described what is claimed as new and useful is:

1. A planter comprising a seed dropping mechanism and a seed covering mechanism, the latter embodying a base member having means for supporting the seed dropping mechanism, angular brackets having a common pivotal mounting on the base member, rotary disks mounted one each on each of the brackets and one of said disks being operatively connected with the seed dropping mechanism, those portions of the brackets engaged with the pivotal mounting having a series of notches registerable in different angular positions of said brackets, and a key carried by the base member and engageable with certain of said registered notches to lock said brackets in selected angular positions.

2. A planter comprising a seed dropping mechanism and a seed covering mechanism, the latter embodying a base member having means for supporting the seed dropping mechanism, angular brackets having a common pivotal mounting on the base member, rotary disks mounted one each on each of the brackets and one of said disks being operatively connected with the seed dropping mechanism, those portions of the brackets engaged with the pivotal mounting having series of notches registerable in different angular positions of said brackets, and a key carried by the base member and engageable with certain of said registered notches to lock said brackets in selected angular positions, the notches being formed in peripheral edges of the angular brackets and the key having a threaded shank passing through the base member and a nut engaged with said shank and bearing against the under face of the base member.

In testimony whereof he affixes his signature.

WALTER HUFF.